Sept. 15, 1925.
C. E. IRVINE
ANIMAL TRAP
Filed May 14, 1923 2 Sheets-Sheet 2
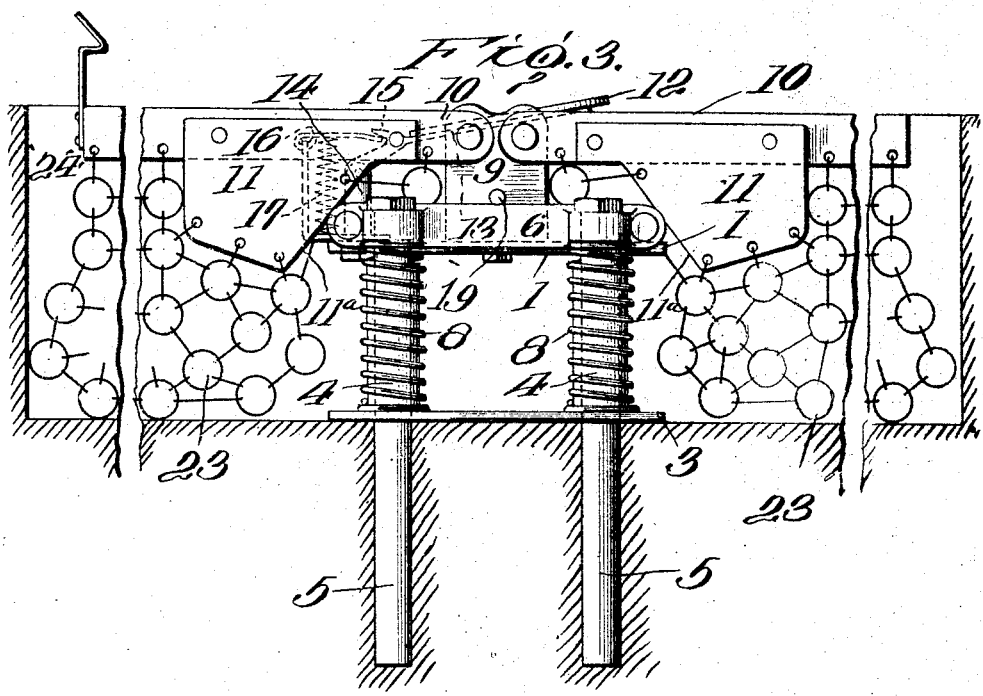
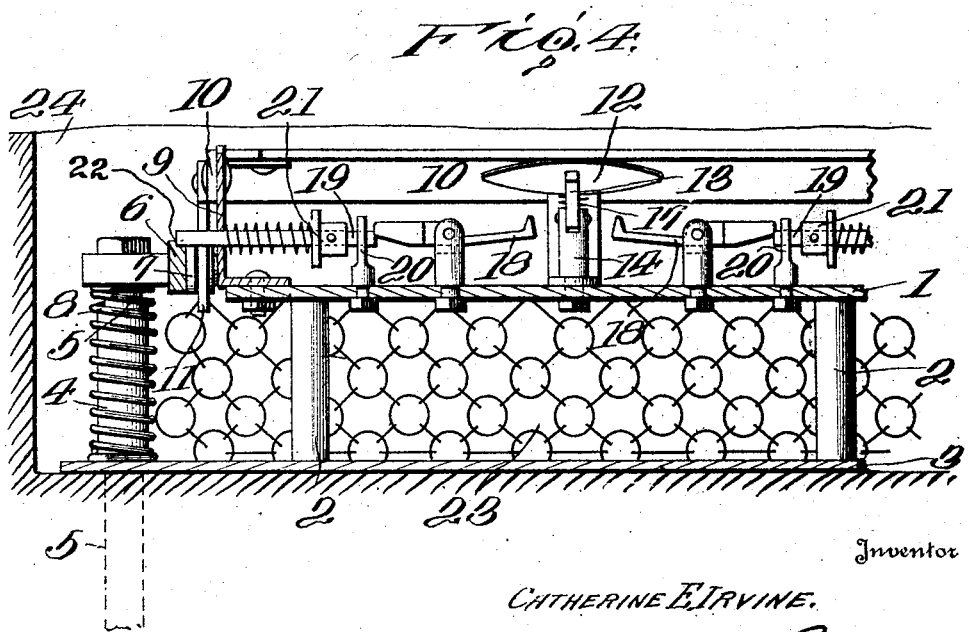
Inventor
CATHERINE E. IRVINE.
By
Attorney Patented Sept. 15, 1925.

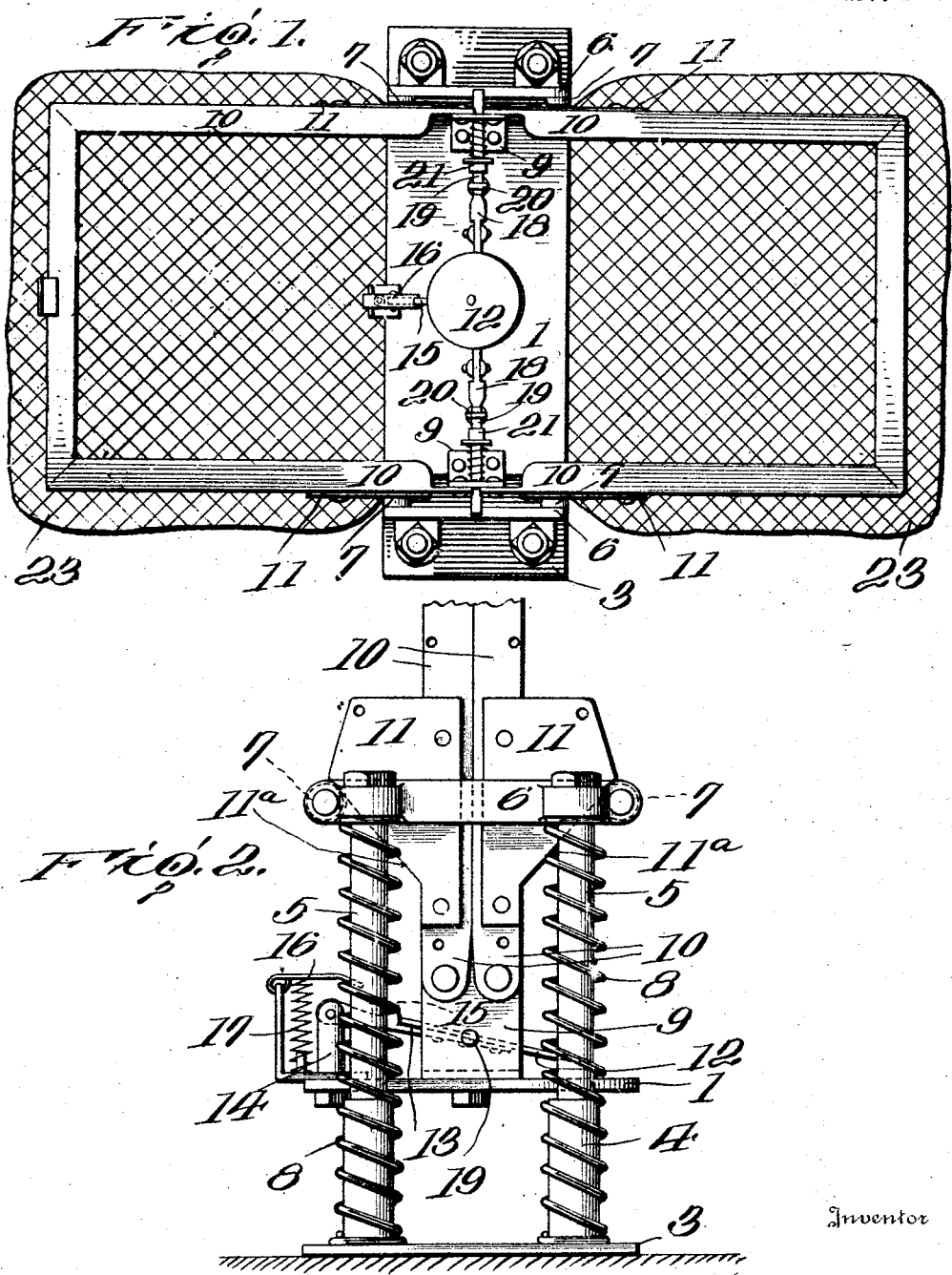

1,553,536

UNITED STATES PATENT OFFICE.

CATHERINE E. IRVINE, OF WINNIPEG, MANITOBA, CANADA.

ANIMAL TRAP.

Application filed May 14, 1923. Serial No. 638,936.

*To all whom it may concern:*

Be it known that I, CATHERINE E. IRVINE, of Winnipeg, in the Province of Manitoba, Canada, have invented certain new and useful Improvements in Animal Traps; and I do hereby declare the following to be a full, clear, and exact description of the invention, such as will enable others skilled in the art to which it appertains to make and use the same.

The invention relates to improvements in animal traps and an object of the invention is to provide a humane trap which will catch the animal without harming it in any way, and to construct the trap so that it can be readily set, is positive in its action, so designed that there is no possibility of the animal getting away when it is being caught or after it has been caught, nor harmed during the trapping action.

A further object of the invention is to construct a particularly sensitive trap in a strong and durable manner and one which can be readily manufactured at comparatively small cost.

Figure 1 is a plan view in the set position. Figure 2 is an end view in the closed position. Figure 3 is an end view in the set position. Figure 4 is a detailed vertical sectional view transversely and centrally through the trap.

The body of the trap, which is stationary, comprises an elevated plate or platform 1 carried by suitably positioned corner legs 2 of equal length extending upwardly from a base plate 3. The elevated plate is somewhat shorter in length than the base plate to allow for the placing on the base plate of vertically disposed pairs of stationary tubular guides 4 there being a pair of the guides located at each end of the base plate entirely clear of the ends of the elevated plate. The pairs of guides receive vertically disposed pairs of spindles 5 and to the upper ends of the pairs of spindles, I secure permanently cross heads 6, the cross heads being fitted at their ends with rollers 7, the rollers being mounted on the inner sides of the cross heads. Coil springs 8 are placed around the spindles, and tubular guides 4, having their lower ends engaging with the base plate and their upper ends against the cross heads at their points of connection with the spindles. These springs are at all times under compression.

Centrally and to the ends of the elevated plate 1, I secure permanently opposed angle brackets 9 and to the vertical arms of the brackets I attach pivotally the ends of a pair of jaw-like arms 10 which are adapted to close together when brought to the vertical position. The jaws are suitably reinforced and extend in the vertical position considerably above the cross heads 6. It will be observed that the jaws are so positioned that they just nicely clear the inside faces of the cross heads.

To the jaws I secure permanently pairs of cam plates 11, the cam plates each presenting an inclining edge $11^a$ which engages and rides over the adjacent roller 7 of the cross head.

By properly designing and placing the parts it will be apparent that the springs acting on the cross heads and through the rollers and cams will normally maintain the jaws closed and in the vertical position and that the opening action of the jaws is resisted by the springs, the resistance increasing as the jaws approach the horizontal position.

As appropriate means for actuating the structure described I provide the following parts. Centrally of the elevated plate I locate a bait plate 12 which is carried by an arm 13, the arm being pivotally secured to a vertical post 14 fastened centrally to the side of the elevated plate. The arm is fitted with a catch or hook 15 which is adapted to be engaged in the set position of the bait plate with a spring pressed latch 16. The latter arrangement is such that the latch spring 17 up-presses the latch and holds it caught in the catch where it remains until the bait plate is released by downward pressure.

Directly underneath the bait plate and in a position such that they will be struck by the downward moving bait plate I locate the inner ends of a pair of pivoted normally horizontally disposed triggers 18 which have their outer ends weighted and engageable with the inner ends of inwardly spring pressed setting rods 19.

Here it will be observed that the outer ends of the rods 19 protrude through and are slidably received by the angle brackets 9 and at the inner ends are carried slidably by small brackets 20 and that the springs actuating the rods operate between the angle brackets and collars 21 secured to the setting rods.

Centrally of the cross heads 6 and on the inner sides thereof I form locking recesses constituting stops 22 and these are adapted to pass beneath the outer ends of the settings rods in the open or horizontal position of the jaws and lock the jaws in such open position.

Between the jaws and the elevated plate I locate a flexible bag like netting 23 which when the jaws are closed forms a bag in which the animal is caught.

The netting will be preferably formed from steel wire so that it can be positively relied upon to hold the entrapped animal and it will have to be designed to give sufficient fullness to contain the animal without injury when the trap is closed.

When one wishes to set the trap he preferably makes a small pit 24 in the ground to receive the base plate, the pit being deep enough to bring the elevated plate to ground level. He then catches the jaws and spreads them until they come to the horizontal position, in which position he holds them until he sets the bait plate. He then sets the triggers by out pressing the collars 21 to pass the outer ends of the setting rods 19 over their stops. As the setting rods go out the outer ends of the triggers drop down and so soon as one releases his finger pressure from the collars the inner ends of the setting rods press against the outer ends of the triggers and hold them in set position, while the outer ends of the setting rods positively lock the cross heads against any up movement.

Having so set the trap one places the bait on the bait pan and scatters twigs or leaves over the bottom of the trap, as is customary practice, so as not to make the animal suspicions.

It will be observed that in the set condition the springs are heavily compressed and very active, with the result that just as soon as the animal presses upon the bait plate the jaws close over the top of the animal and entrap him in the mesh-like bag.

It will be appreciated that the use of a pair of spaced vertically guided sliding spindles 5 for supporting each cross head 6 furnishes a positive guiding means for the same when the trap is sprung and also provides a very effective auxiliary support for the jaws 10 when in closed position. Thus an animal after having been caught in the trap will be less likely to free himself or weaken the trap in his struggles to escape. The jaw carried cam plates 11 working in connection with the cross head carried rollers 7 serve to assure rapid actuation of the jaw 10, said cam plates also serving as abutments to check movement of the cross heads 6 after the jaws 10 are closed. Thus relatively short powerful springs can be used which will at all times function to urge the jaws toward each other.

I claim as my invention:

1. In an animal trap, a supporting plate, a pair of jaws pivoted to said plate, vertically movable cross heads to engage said jaws, vertically movable supports for each of said cross-heads, guiding means for said supports, and spring controlled means to actuate said cross heads.

2. In an animal trap, a supporting plate, angle brackets on the ends of said plate, a pair of jaws pivoted on said brackets, cam plates on said jaws, vertically movable cross heads to move said jaws and having rollers to engage said cam surfaces, and spring controlled means to actuate said cross heads.

3. In an animal trap, a pit and a trap adapted to rest within said pit and lie flush with the ground surface, said trap having a base to lie upon the bottom of the pit, tubular guides mounted on said base, spindles movable in said guides and normally extending through said base and the bottom of the pit, cross heads mounted on the tops of said spindles, springs coiled upon said guides and bearing against said base and said cross heads, a pair of pivotally mounted jaws lying flush with the ground surface when the trap is set and each carrying wire mesh cage surfaces, said jaws adapted for closing movement by said cross heads, a bait device, and means operated by the movement of said bait device for releasing said cross heads and closing said jaws.

4. In an animal trap, the combination with a plate having angle brackets at its ends, of a pair of jaws pivoted to said brackets, and spring actuated cross heads for closing said jaws, of rods mounted on said plate and extending through said brackets, mechanism normally holding said rods in position to restrain said cross heads, and a bait device adapted upon movement to release said mechanism.

5. In an animal trap, a supporting plate, a pair of jaws pivoted to said plate, said jaws having outwardly directed cam portions formed thereon and increasing in depth in the direction of the upper ends thereof, vertically movable members cooperable with said cam portions for closing said jaws, and spring controlled means for actuating said movable members.

6. In an animal trap, the combination with a plate having angle brackets at its ends, of a pair of jaws pivoted to said brackets, and spring actuated cross heads for closing said jaws, of spring actuated rods mounted on said plate and extending through said brackets, pivoted elements carried by said plate for holding said rods in position to restrain said cross heads, and a bait device adapted for movement to release said pivoted elements.

In testimony whereof I have signed this specification.

CATHERINE E. IRVINE.